(12) United States Patent
Rosert et al.

(10) Patent No.: US 9,492,691 B2
(45) Date of Patent: Nov. 15, 2016

(54) DIRECTIONAL VALVE AND RESPIRATOR PRODUCT WITH A DIRECTIONAL VALVE

(71) Applicant: Dräger Safety AG & Co. KGaA, Lübeck (DE)

(72) Inventors: Michael Rosert, Timmendorfer Strand (DE); Dennis Leske, Eutin (DE); Harald Heyer, Klein Wesenberg (DE); Thomas Pancur, Altenholz (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 359 days.

(21) Appl. No.: 14/026,213

(22) Filed: Sep. 13, 2013

(65) Prior Publication Data

US 2014/0076325 A1  Mar. 20, 2014

(30) Foreign Application Priority Data

Sep. 14, 2012 (DE) .......................... 10 2012 018 277

(51) Int. Cl.
  *A62B 18/08* (2006.01)
  *A62B 18/10* (2006.01)
  *A62B 23/02* (2006.01)
  *F16K 15/14* (2006.01)

(52) U.S. Cl.
  CPC ............. *A62B 18/10* (2013.01); *A62B 23/025* (2013.01); *F16K 15/14* (2013.01); *Y10T 137/7888* (2015.04)

(58) Field of Classification Search
  CPC .................... A61M 16/20; A61M 2202/0208; A62B 18/10; A62B 9/02; Y10T 137/7888; Y10T 137/789; F16K 15/148
  USPC .................... 128/206.12–15, 201.28, 203.11, 128/205.24, 207.12, 207.16; 131/455, 524; 137/854
  See application file for complete search history.

(56) References Cited

U.S. PATENT DOCUMENTS

| 5,154,168 A | 10/1992 | Schlobohm |
| 6,047,698 A * | 4/2000 | Magidson .............. A62B 18/10 128/205.24 |
| 2004/0182446 A1 | 9/2004 | Semeia |
| 2004/0255948 A1 | 12/2004 | Smith et al. |
| 2008/0178884 A1 | 7/2008 | Gerson et al. |

FOREIGN PATENT DOCUMENTS

| CN | 2778308 Y | 5/2006 |
| CN | 201135713 Y | 10/2008 |
| CN | 102160917 A | 8/2011 |
| DE | 4 017 336 C1 | 6/1991 |
| DE | 10 2011 113 716 A1 | 3/2013 |
| EP | 0252890 A1 | 1/1988 |

\* cited by examiner

*Primary Examiner* — Bradley Philips
*Assistant Examiner* — Victoria Leszczak
(74) *Attorney, Agent, or Firm* — McGlew and Tuttle, P.C.

(57) ABSTRACT

A directional valve for a respirator product includes a valve housing (15) and a valve seat (1) for receiving a flexible valve membrane (16). The valve seat has a circular and essentially flat sealing surface (2) surrounding an opening (3), which is sealingly covered by the valve membrane during an inspiration phase. A fixing lug (13), on the valve housing (15), fixes the valve membrane in the valve seat and is arranged offset in relation to the center of the valve membrane, such that an entire circumferential surface of the valve membrane is lifted off from the sealing surface during an expiration phase. The fixing lug is directed essentially at right angles to a flow plane formed by the opening. A counter-support (25), within the opening, is arranged opposite the fixing lug such that the valve membrane is mounted with fixed clamping action, between the fixing lug and the counter-support.

20 Claims, 3 Drawing Sheets

DIRECTIONAL VALVE AND RESPIRATOR PRODUCT WITH A DIRECTIONAL VALVE

CROSS REFERENCE TO RELATED APPLICATIONS

This application claims the benefit of priority under 35 U.S.C. §119 of German Patent Application DE 10 2012 018 277.5 filed Sep. 14, 2012, the entire contents of which are incorporated herein by reference.

FIELD OF THE INVENTION

The present invention pertains to a directional valve and to a respirator product with a directional valve.

BACKGROUND OF THE INVENTION

A respirator product in the form of a gas mask with port openings for filters as well as with an inspiration valve and with an expiration valve is known from DE 40 17 336 C1. Respirator filters can be arranged at different points of the half mask by means of a port adapter that can be fastened to a half mask in two preferential positions. The gas flow over the respirator filter is guided into the interior space of the mask to the mask user by means of directional valves, which are arranged both in the area of the respirator filter and at the gas outlet of the gas mask, and the breathing mask enters the environment via an expiration valve during the expiration phase. The directional valves comprise a valve seat and a valve membrane lying on the valve seat, which is fastened centrally at the valve seat. The valve membrane is lifted off from the valve seat during gas flow through the directional valve, so that a gas flow is made possible. The drawback of the prior-art valve design is that the flow resistance is relatively high, because the length of the membrane section that can be deflected by the gas flow is limited by the diameter of the valve seat due to the valve membrane being fastened centrally.

Directional valves for breathing masks that have a valve membrane that is fastened at the valve seat on one side and can be lifted off from the valve seat in the manner of a flap are known. Such a directional valve is described, for example, in U.S. Pat. No. 6,047,698. A valve membrane cut to a rectangular shape lies on a flat valve seat and is pressed against the valve seat by a fixing lug fastened to the edge of the valve cover. Even though a markedly lower flow resistance can be achieved with this valve design than with a directional valve with centrally fastened valve membrane, leakage is higher because of the one-sided fastening of the valve membrane, and the valve membrane may stick due to the adhesive forces in case of a possible condensation of moist expired air on the inside of the valve cover, as a result of which the closing of the directional valve may be delayed or may fail to occur altogether.

SUMMARY OF THE INVENTION

A basic object of the present invention is to improve a directional valve in respect to its functional properties and to provide a respirator product with a corresponding directional valve. In particular, a high level of tightness of the valve shall be ensured even if it is subject to mechanical stresses.

According to the invention, a directional valve is provided for a respirator product. The directional valve comprises a valve housing, a valve seat defining an opening and a flexible valve membrane received by the valve housing. The valve seat has a circular and essentially flat sealing surface, which surrounds the opening, which is sealingly covered by the valve membrane during an inspiration phase. A fixing lug is arranged on the valve housing and fixes the valve membrane in a position relative to the valve seat and supporting the sealing of the sealing surface by the valve membrane during the inspiration phase. The fixing lug is arranged offset in relation to the center of the valve membrane such that the entire circumferential area of the valve membrane is lifted off from the sealing surface during an expiration phase. The fixing lug is directed essentially at right angles to a flow plane defined by the opening. A counter-support is provided within the opening. The counter-support is arranged opposite the fixing lug in such a way that the valve membrane is mounted with a fixed clamping action between the fixing lug and the counter-support.

According to another aspect of the invention, a respirator product is provided comprising the directional valve.

It was found that the flow resistance drops markedly in case of a slightly eccentric fixation of the valve membrane. Up to a gas flow rate of about 80 L/minute, the flow resistance is only about 60% of the value for a centrally fastened valve membrane in case of a round, eccentrically fixed valve membrane. The valve membrane is preferably round, but it may also be oval, elliptical, square or rectangular. The axis length (the extension of the valve membrane along a line) is the diameter D of the valve membrane in case of a round valve membrane. The axis length of the greatest longitudinal extension is defined as the length of the principal axis (major axis–maximum dimension) in case of an elliptical valve membrane. According to the present invention, the valve membrane is fixed by a fixing lug (fixing nose or fixing portion) to an counter-support, which is located within an opening defined by the valve seat. The fixing nose is arranged at the valve housing, preferably at a valve cover of the valve housing comprising the valve cover and the valve seat. The dimensions of the fixing lug are selected to be such that the fixing lug presses the valve membrane against the counter-support. The valve membrane is mounted between the fixing lug and the counter-support in the form of a fixed clamping, so that the valve membrane is in contact with the sealing surface of the valve seat when there is no flow through the valve. The fixing lug preferably has a Y-shaped design and has a plurality of fixing points. An arching of the valve membrane can be achieved due to this shape, so that the valve membrane is in contact with the sealing surface with a prestress and good sealing is guaranteed. However, the valve membrane is preferably fixed in a punctiform manner between the fixing lug and the counter-support on an area smaller than 2 $mm^2$. In addition, the eccentric fixation according to the present invention of the valve membrane leads to the advantage that adhesive effects of the valve membrane on the valve cover as a consequence of condensing moisture are markedly reduced, because the lift of the freely movable area of the valve membrane is markedly smaller in case of a slightly eccentric fixation than in case of fixation at the edge. The eccentric fixation is in a range of 8% to 15% of the axis length D of the greatest longitudinal extension of the valve membrane. Since the valve membrane can move freely on both sides of the fixing lug, the entire opening located within the sealing surface is available for the flow of gas. Both a mechanically stable fastening of the valve membrane in the vicinity of the center of the membrane and reduced flow resistance compared to a central fastening are achieved with the eccentric fastening according to the present invention of the valve membrane between the fixing lug and the counter-support. The counter-support is preferably fastened to an elastically deformable cross strut, so that the valve membrane is held by a clamping effect between the fixing lug and the counter-support. The counter-support or the cross strut, to which the counter-support is fastened, is fastened to a valve cross within the opening. The valve cross can be designed in terms of the thickness of the material and strength such that it is essentially deformable only slightly. The prestress of the counter-support in relation to the fixing lug, with which the valve disk is clamped, is generated by the spring action of the cross strut fastened to the valve cross. Due to the valve disk being clamped between the fixing lug and the counter-support, it is achieved that the valve disk cannot slip towards the edge even in case of a high mechanical stress, for example, due to shock or intense expiration, and leakage is therefore avoided.

Respirator products with the directional valve according to the present invention are half masks, full face masks or filtering half masks. However, protective hoods may also be equipped with directional valves.

An exemplary embodiment of the device according to the present invention is shown in the drawings and will be explained in more detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
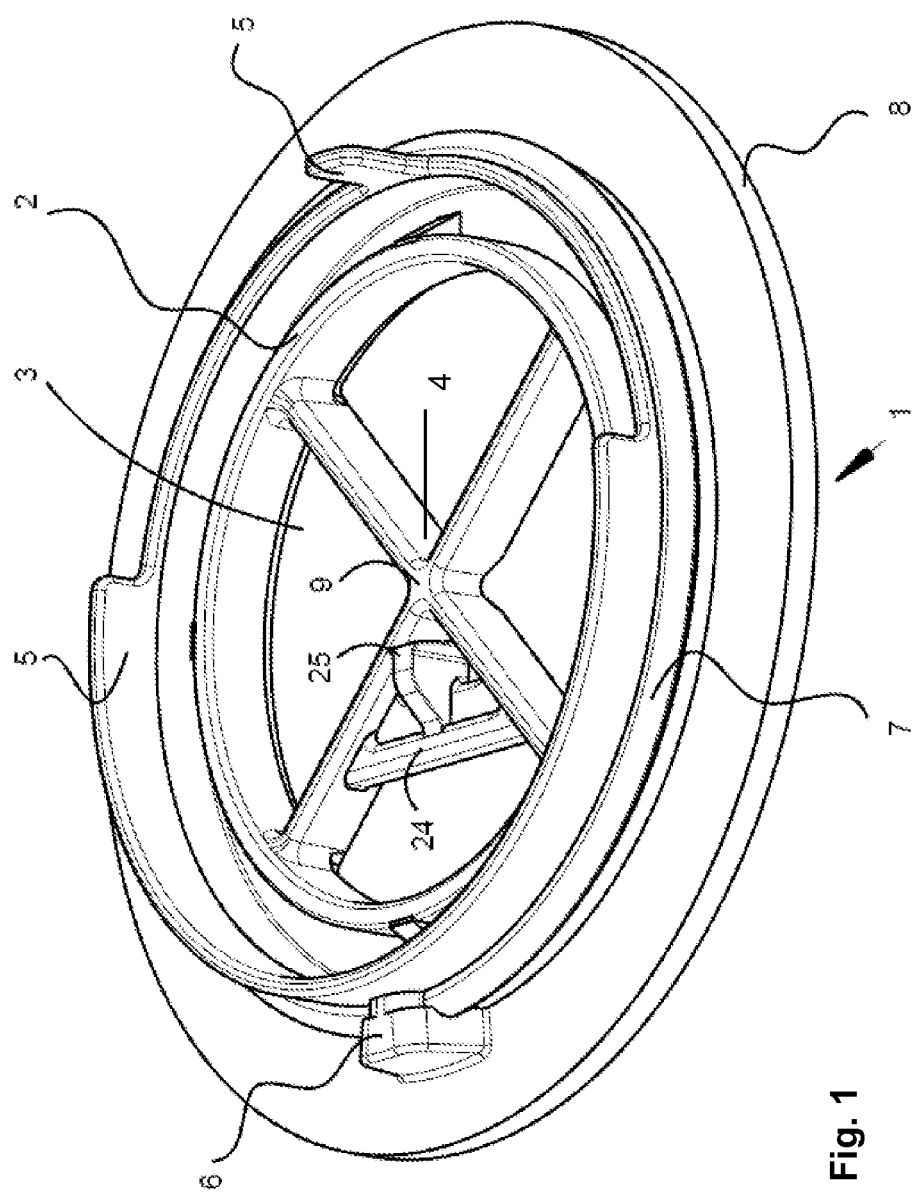
FIG. 1 is a perspective view of a valve seat of a valve according to the invention.

Referring to the drawings in particular, FIG. 1 shows a valve seat 1 with a flat sealing surface 2, which surrounds an opening 3 through which the gas flows. Opening 3 is divided into four sectors by a valve cross 4. An upright edge 5, which is interrupted in some areas and receives a valve membrane, not shown in FIG. 1, is located around the sealing surface 2. The upright edge 5 is used to center the valve membrane in relation to the sealing surface 2. A centering projection 6 and a circular bead 7 are located on the outside of edge 5. The underside 8 of valve seat 1 is connected to a filter mask 22. The webs of the valve cross 4 intersect each other in a center 9. A counter-support 25 is located at a cross strut 24, which is fastened between two arms of the valve cross 4. In case of a valve membrane of round shape, the center 9 of the valve cross 4 coincides with the center of the surface of the valve membrane.

Figure 2:
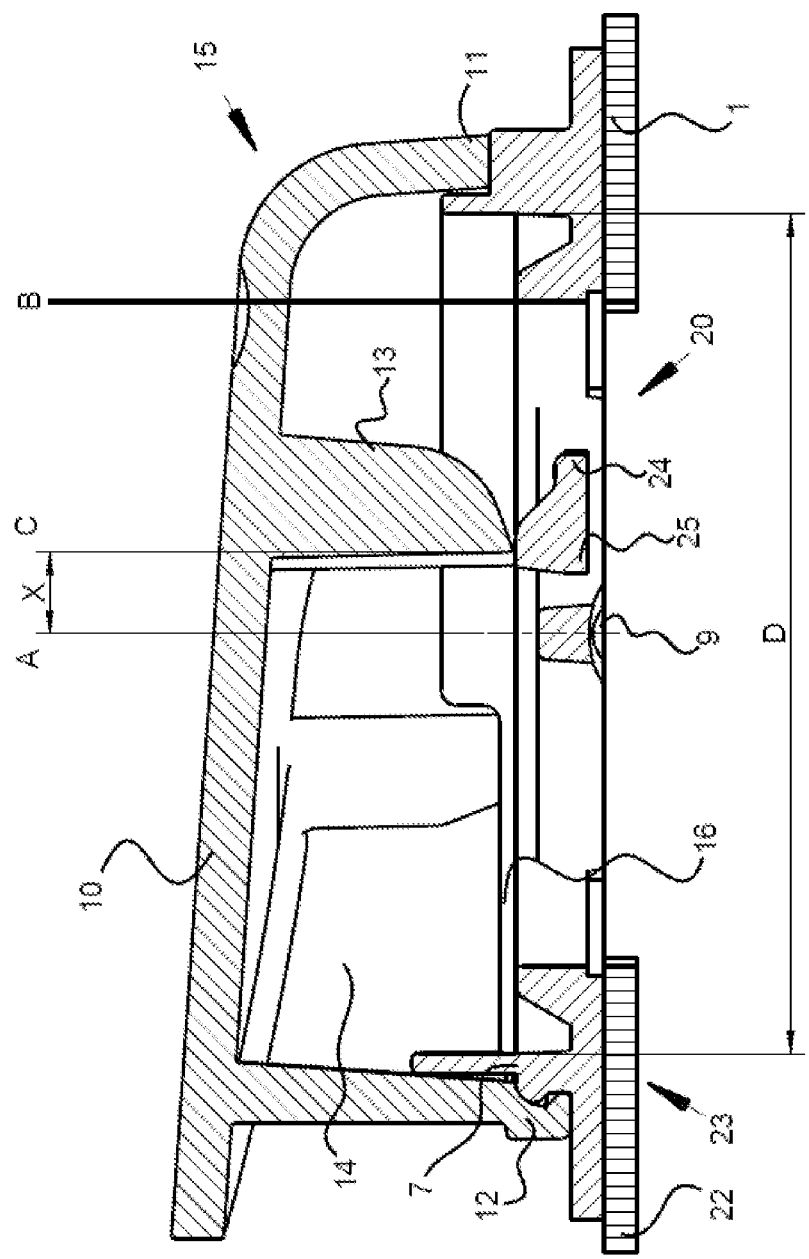
FIG. 2 is a longitudinal sectional view of a directional valve according to the invention.

FIG. 2 shows the longitudinal section of a directional valve 20 that is a part of a respirator product in the form of a gas mask 23. Identical components are designated by the same reference numbers as in FIG. 1. A fixing lug 13 is fastened on the inside of a valve cover 10 such that an offset x is obtained in relation to the center 9 (of the valve membrane 16), the distance between "A" and "C." Relative to the diameter D of the valve membrane 16, the x/D ratio (the ratio of the offset from the center distance (x) relative to the greatest longitudinal extension distance (D)) is in a range of 8% to 15%. The fact that the fixing lug 13 is positioned in the vicinity of the center 9 causes the valve membrane 16 to lift off on both sides of the fixing lug 13 during flow of gas through the sealing surface 2. "B" illustrates the edge of the sealing surface 2, which edge is directed towards (faces) the valve cross 4 and defines the opening 3.

Valve cover 10 is fastened on the valve seat 1 in a preferential position and valve cover 10 has a centering groove 11 to assist in positioning in the preferred position, the centering groove 11 has a design corresponding to that of the centering projection 6. A circular groove 12 on the valve cover 10 and a bead 7 having a design corresponding thereto on the valve seat 1 are provided for the mechanical fixation. Valve cover 10 has, in addition, outflow openings 14.

Valve seat 1 and valve cover 10 together form a valve housing 15. The directional valve 20 is formed by the valve housing 15 with the valve membrane 16 inserted. Valve membrane 16 is clamped between the fixing lug 13 and the counter-support 25. It is achieved thereby that the valve disk 16 is held even in case of high mechanical stress and leakage is therefore avoided.

The directional valve 20 is connected as an expiration valve to a filter mask 22 on the underside 8 of valve seat 1. Filter mask 22 and directional valve 20 together form the gas mask 23.

Figure 3:
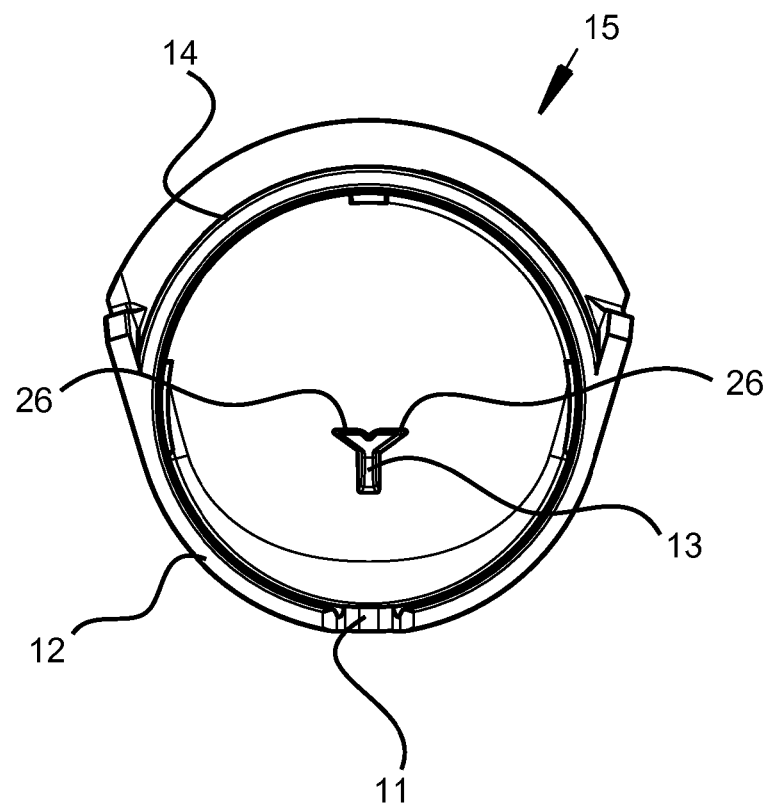
FIG. 3 is an end view of a valve housing of the directional valve.

FIG. 3 shows the valve housing generally designated 15. The fixing lug 13 of the valve housing 15 has an Y-shaped design with side branches 26. The valve housing 15 is attached to the valve seat 1 (with centering groove 11 over centering projection 6). With this the side branches 26 are brought in contact with opposite sides of the counter-support 25. This results in the branches 26 clamping the counter-support 25. This clamping action of the counter-support 25 ensures that the membrane is not displaced. The construction provides a good sealing.

While specific embodiments of the invention have been shown and described in detail to illustrate the application of the principles of the invention, it will be understood that the invention may be embodied otherwise without departing from such principles.

| LIST OF REFERENCE NUMBERS | |
|---|---|
| 1 | Valve seat |
| 2 | Sealing surface |
| 3 | Opening |
| 4 | Valve cross |
| 5 | Upright edge |
| 6 | Centering projection |
| 7 | Bead |
| 8 | Underside |
| 9 | Center |
| 10 | Valve cover |
| 11 | Centering groove |
| 12 | Circular groove |
| 13 | Fixing lug |
| 14 | Outflow openings |
| 15 | Valve housing |
| 16 | Valve membrane |
| 20 | Directional valve |
| 22 | Filter mask |
| 23 | Gas mask |
| 24 | Cross strut |
| 25 | Counter-support |
| 26 | Side branches |

What is claimed is:

1. A directional valve for a respirator product, the directional valve comprising:
   a valve housing;
   a valve seat defining an opening;
   a flexible valve membrane received by the valve housing, the valve seat having a circular and essentially flat sealing surface, which surrounds the opening, which is sealingly covered by the valve membrane during an inspiration phase;
   a fixing lug arranged on the valve housing and fixing the valve membrane in a position relative to the valve seat and supporting the sealing of the sealing surface by the valve membrane during the inspiration phase, wherein the fixing lug is arranged offset in relation to a center of the valve membrane such that an entire 360° circumferential peripheral edge of the valve membrane extending about the fixing lug is lifted off from the sealing surface during an expiration phase and the fixing lug is directed essentially at right angles to a flow plane defined by the opening; and
   a counter-support within the opening, the counter-support being arranged opposite the fixing lug in such a way that the valve membrane is mounted with a fixed clamping action between the fixing lug and the counter-support.

2. The directional valve in accordance with claim 1, wherein:
   the valve seat includes a cross strut; and
   the counter-support is fastened to the cross strut.

3. The directional valve in accordance with claim 1, wherein the valve membrane is clamped by the clamping action between the fixing lug and the counter-support, wherein said valve membrane is freely movable on each side of said fixing lug.

4. The directional valve in accordance with claim 2, wherein the cross strut is fastened to a valve cross arranged within the opening.

5. The directional valve in accordance with claim 1, wherein the fixing lug has an offset, from a center of the valve membrane, in a range of 8% to 15% relative to a length of a greatest longitudinal extension of the valve membrane.

6. The directional valve in accordance with claim 1, wherein the fixing lug has a Y-shaped cross section.

7. The directional valve in accordance with claim 1, wherein the fixing lug has a plurality of fixing points in relation to the counter-support.

8. The directional valve in accordance with claim 1, wherein the valve membrane is round and a greatest longitudinal extension of the valve membrane is a diameter of the valve membrane, said greatest longitudinal extension of the valve membrane comprising a longitudinal axis, said fixing lug and said counter-support being located at a spaced location from said longitudinal axis.

9. A respirator product comprising a directional valve, the directional valve comprising:
   a valve housing;
   a valve seat defining an opening;
   a flexible valve membrane received by the valve housing, the valve seat having a circular and essentially flat sealing surface, which surrounds the opening, which is sealingly covered by the valve membrane during an inspiration phase;
   a fixing lug arranged on the valve housing and fixing the valve membrane in a position relative to the valve seat and supporting the sealing of the sealing surface by the valve membrane during the inspiration phase, wherein the fixing lug is arranged offset in relation to a center of the valve membrane such that an entire circumferential peripheral edge of the valve membrane is lifted off from the sealing surface during an expiration phase and the fixing lug is directed essentially at right angles to a flow plane defined by the opening, wherein the entire circumferential peripheral edge defines an entire circumference of the valve membrane; and
   a counter-support within the opening, the counter-support being arranged opposite the fixing lug in such a way that the valve membrane is mounted with a fixed clamping action between the fixing lug and the counter-support.

10. The respirator product in accordance with claim 9, wherein:
    the valve seat includes a cross strut; and
    the counter-support is fastened to the cross strut.

11. The respirator product in accordance with claim 9, wherein the valve membrane is clamped by the clamping action between the fixing lug and the counter-support, wherein said valve membrane is freely movable on each side of said fixing lug.

12. The respirator product in accordance with claim 10, wherein the cross strut is fastened to a valve cross arranged within the opening.

13. The respirator product in accordance with claim 9, wherein the fixing lug has an offset, from a center of the valve membrane, in a range of 8% to 15% relative to a length of a greatest longitudinal extension of the valve membrane.

14. The respirator product in accordance with claim 9, wherein the fixing lug has a Y-shaped cross section.

15. The respirator product in accordance with claim 9, wherein the fixing lug has a plurality of fixing points in relation to the counter-support.

16. The respirator product in accordance with claim 9, wherein the valve membrane is round and a greatest longitudinal extension of the valve membrane is a diameter of the valve membrane, said greatest longitudinal extension of the valve membrane comprising a longitudinal axis, said fixing lug and said counter-support being located at a spaced location from said longitudinal axis.

17. A directional valve for a respirator product, the directional valve comprising:
    a valve housing;
    a valve seat comprising an annular opening;
    a flexible valve membrane received by the valve housing, the valve seat having an annular and essentially flat sealing surface, which surrounds said annular opening, said flexible valve membrane sealing said annular opening during an inspiration phase;
    a fixing lug arranged on the valve housing and fixing the valve membrane in a position relative to the valve seat and supporting the sealing of the sealing surface by the valve membrane during the inspiration phase, wherein the fixing lug is arranged offset in relation to the center of the valve membrane such that an entire annular peripheral edge of the valve membrane is lifted off from the sealing surface during an expiration phase and the fixing lug is directed essentially at right angles to a flow plane defined by the opening, wherein the annular peripheral edge defines an entire circumference of the valve membrane; and
    a counter-support within the opening, the counter-support being arranged opposite the fixing lug in such a way that the valve membrane is mounted with a fixed clamping action between the fixing lug and the counter-support.

18. The directional valve in accordance with claim 1, wherein the valve membrane is clamped by clamping action between the fixing lug and the counter-support, wherein said valve membrane is freely movable on each side of said fixing lug.

19. The directional valve in accordance with claim 17, wherein the fixing lug is offset, from said center of the valve membrane, relative to a length of a greatest longitudinal extension of the valve membrane, said greatest longitudinal extension of the valve membrane comprising a longitudinal axis, said fixing lug being located at a spaced location from said longitudinal axis.

20. The directional valve in accordance with claim 19, wherein said counter-support is located at a spaced location from said longitudinal axis.

* * * * *